Feb. 29, 1944.  I. W. LOVELADY ET AL  2,342,950

TREATING TANK

Filed May 19, 1941  2 Sheets-Sheet 1

INVENTORS
Isaac W. Lovelady, and
Verne Palmer.
BY Arthur C. Brown
ATTORNEY

Feb. 29, 1944.   I. W. LOVELADY ET AL   2,342,950
TREATING TANK
Filed May 19, 1941   2 Sheets-Sheet 2
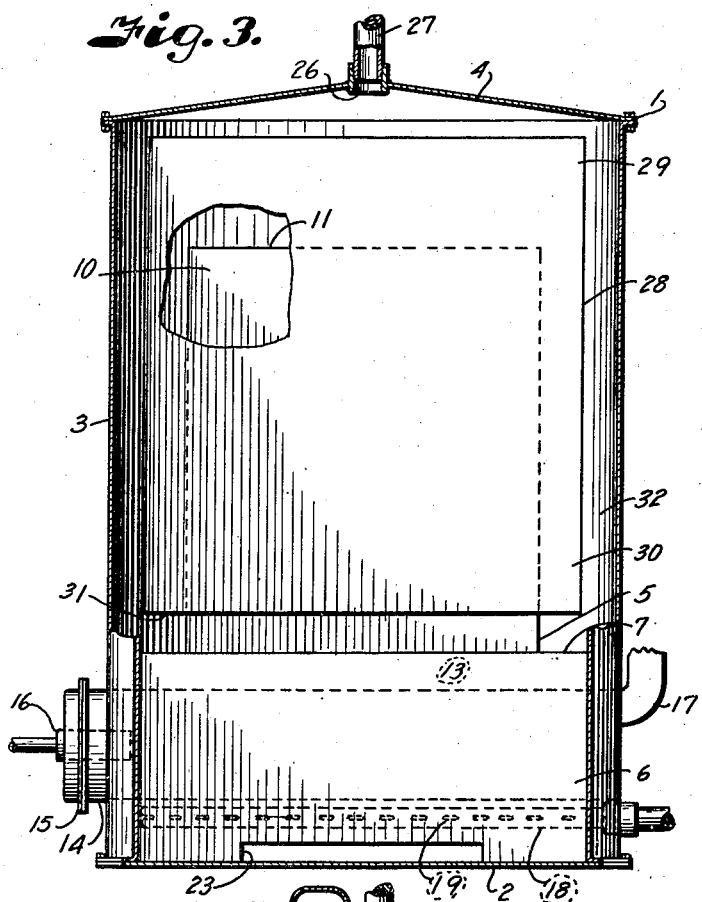
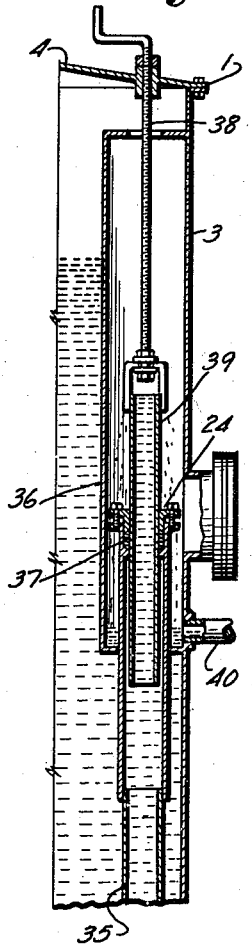
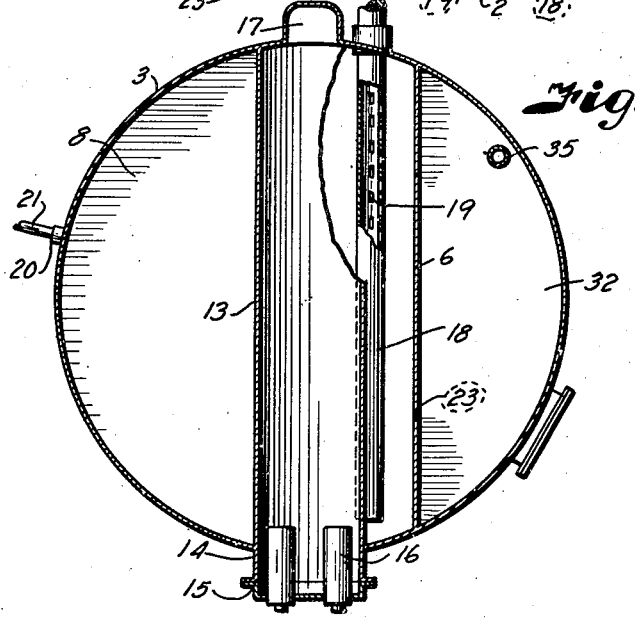
INVENTORS
Isaac W. Lovelady, and
Verne Palmer.
BY
ATTORNEY Patented Feb. 29, 1944

2,342,950

UNITED STATES PATENT OFFICE 2,342,950

TREATING TANK

Isaac W. Lovelady and Verne Palmer,
Oklahoma City, Okla.

Application May 19, 1941, Serial No. 394,242

5 Claims. (Cl. 183—2.7)

This invention relates to apparatus for treating liquids such as oil emulsions or mixtures consisting of cold oil, oil emulsion and water, by heating the liquid, effecting release of the readily gasifiable components of the liquid, and then settling water from the oil in a quiescent zone.

The principal objects of the invention are to provide an apparatus of this character which is of simple construction and inexpensive to manufacture; to provide a treating apparatus wherein the heating and gas separating sections also act to effect separation of the free water; to provide positive liberation of the readily gasifiable liquids by heat and pressure reduction before the liquids to be settled are conducted into the settling or quiescent section; and to provide a treating apparatus wherein the heater is efficient and the heating element readily removable.

Other objects of the invention are to provide a treating tank wherein all of the flumes and chambers communicate at the top thereby allowing a common blanket of gas to rest over them; to provide a construction which avoids agitation of the liquids in the settling chamber; and to provide a communication between the bottom of the heater and settling chambers for transfer of water therebetween and to equalize pressures when the tank is being filled or emptied.

In accomplishing these and other objects of the invention, as hereinafter described, we have provided improved structure, the preferred form of which is illustrated in the accompanying drawings, wherein:

Fig. 3 is a vertical section taken at right angles to the section shown in Fig. 1.

Fig. 4 is a vertical section through the automatic water discharge siphon.

Fig. 5 is a horizontal section on the line 5—5 of Fig. 1.

Figure 1:
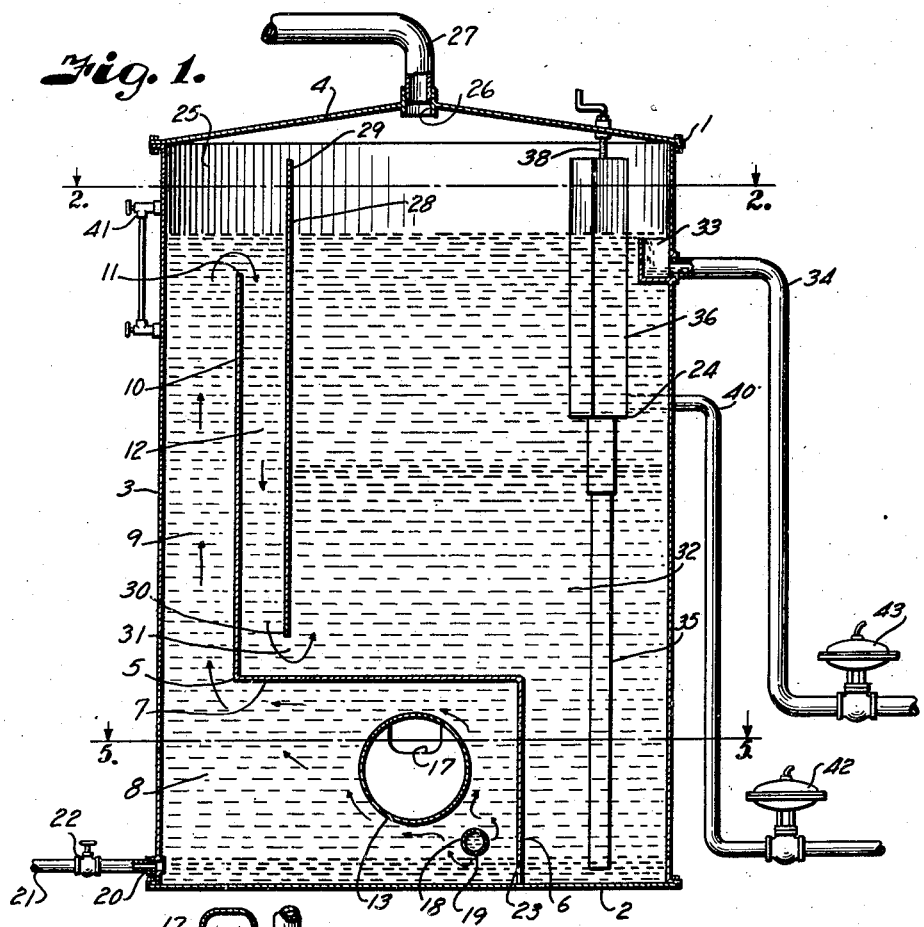
Fig. 1 is a vertical section through a treating apparatus embodying the features of the present invention.
Figure 2:
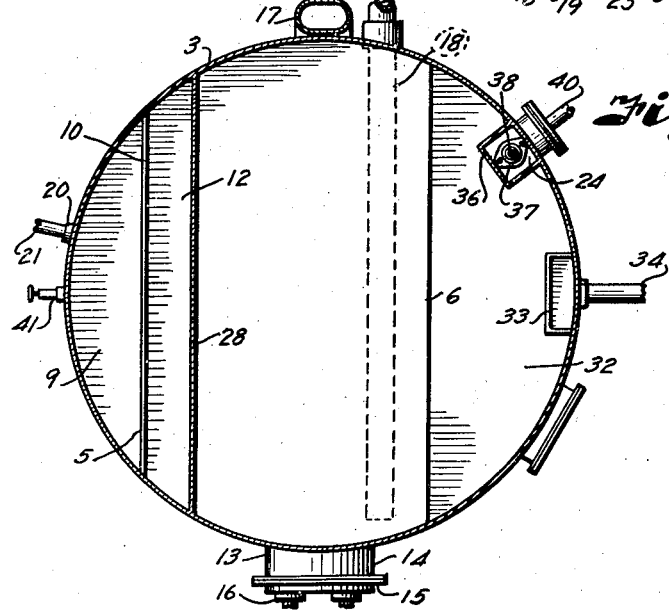
Fig. 2 is a horizontal section through the apparatus on the line 2—2 of Fig. 1.

Referring more in detail to the drawings:

1 designates a treating vessel which may be in the form of a cylindrical tank including a bottom 2, an annular side wall 3, and a top 4. The vessel is divided vertically by a partition 5, having a lower portion 6 extending across the vessel above the bottom thereof and at a point offset from a plane extending through the vertical axis of the vessel. The lower portion of the partition terminates above the bottom 2 in a horizontal portion 7 which terminates in spaced relation with the side wall 3. The portions 6 and 7 of the partition cooperate with a portion of the vessel bottom and adjacent wall to form a heating chamber 8 having outlet to a vertical flume 9 formed between the vessel wall and an upper portion 10 of the partition 5 which connects with the terminal edge of the horizontal portion 7. The upper portion 10 extends substantially in a vertical plane on a chord of the vessel and has its upper edge spaced substantially below the top 4 to form a weir 11 over which the liquid flows into a downwardly extending flume 12, later described.

The heating chamber contains an internal fire-box 13 that extends horizontally through the vessel in spaced relation with the section 5 of the partition and at a point above the bottom 2. The fire-box or heating element may be in the form of a cylindrical tube having one end 14 extending through the wall of the vessel and provided with a plate 15 carrying burners or the like 16. The opposite end of the tube may connect with a vent or stack 17 whereby spent products of combustion are discharged from the fire-box. However, it is to be understood that any conventional type of burner may be used.

Extending transversely of the tank at a point below the fire-box, and spaced above the bottom 2, is an inlet pipe 18 having a plurality of downwardly opening slots 19 whereby the liquid mixture to be treated is discharged under the fire-box in substantially close relation therewith so that the lighter components of the liquid, such as oil and oil emulsion, rise upwardly in heat exchange relation with the sides of the fire-box whereby free gas and readily gasifiable components of the liquid are caused to gasify and separate from the oil and oil emulsion to rise therewith in the form of bubbles through the flume 9. The free water carried in the mixture admitted through the inlet pipe gravitates to the bottom of the heating chamber where it may be removed through a lateral port 20 in the wall of the vessel and conducted through an outlet pipe 21 under control of a valve 22, or it may be discharged through an elongated slot 23 formed in the lower edge of the partition 6 for removal by way of an automatic siphon 24, later described.

The oil and oil emulsion, together with the evolved gases, upon rising upwardly through the flume 9, pass through a zone of gradually decreasing pressure from that carried in the heating chamber, thereby assuring release of the gases when the liquids overflow the weir 11 into the down flume 12. The released gases then collect in the gas collecting chamber 25 at the top of the vessel and are discharged through a port 26 in the top 4 into a pipe 27.

The down flume 12 is formed between the upper portion 10 in the partition 5 and a vertical partition 28 which extends across the vessel and has its upper end 29 extending above the weir and into the gas chamber to assure downward deflection of the liquids. The lower end 30 of the partition 28 terminates above the horizontal section 7 of the partition 5 to form an outlet 31 into a settling chamber 32. As the oil and oil emulsion move downwardly in the flume 12, the pressure gradually increases incidental to the static head and the temperature decreases to prevent further release and breaking out of the gas through the liquid carried in the settling chamber. The water from the emulsion gravitates downwardly in the settling chamber and the oil flow is upwardly, the oil being discharged into an outlet box 33 carried by the side of the tank at the liquid level to be maintained in the settling chamber. The oil flows from the box through a conductor pipe 34. The water which collects in the bottom of the vessel is discharged through the automatic siphon 24 which consists of a riser pipe 35 extending upwardly within the vessel and terminating in a control box 36 which is also carried on the side wall of the vessel. Slidably adjustable through a stuffing box 37 by means of a screw-shaft 38 is a tube 39 which governs the hydrostatic head at which the water is discharged under pressure of the head of water and separated oil in the settling chamber. The water, upon discharge from the control tube 39, falls into the control box to be discharged through a pipe 40.

The tank may be provided with various fittings necessary to maintain an accurate control of the operation, such as a sight gauge 41, automatic shut-off valves 42 and 43 in the respective water and oil discharge pipes, and other fittings usually provided on this type of equipment.

In operation the liquid mixture to be treated is admitted through the pipe 18 and discharged through the slots 19 into the heating chamber 8. The free water contained in the liquid separates from the mixture and gravitates to the bottom of the heating chamber, but the oil and oil emulsion, being of lighter specific gravity, rise upwardly in heating contact with the sides of the fire-box to absorb heat therefrom and raise the temperature of the oil and oil emulsion to the point where the oil emulsion is readily broken. The heated liquids rise through the conductor flume 9 and travel through the zone of gradually decreasing pressure so that the readily gasifiable components escape from the liquid and collect in the gas separating section for discharge through the pipe 27. The liquids, upon reaching the top of the flume, overflow the weir 11 and move downwardly through the flume 12 where the pressure gradually increases because of the hydrostatic head carried in the settling chamber, thereby preventing further release of gas which would ordinarily interfere with the settling action of the liquids. Upon reaching the lower end of the down flume, the liquids are discharged into the settling chamber where the water moves downwardly across the partition section 7 and flows into the sump formed between the partition 6 and the side wall of the tank opposite the heating chamber. The oil component of the emulsion and free oil, being of lighter specific gravity, rise through the liquid and collect in the top of the settling chamber for overflow into the box 33 for discharge through the pipe 34. The water, as it accumulates, rises in the pipe 35 and discharges through the top of the control tube 39 for discharge through the pipe 40, the control tube 39 having been adjusted to the desired level.

From the foregoing it is obvious that we have provided a separating apparatus which is of simple, inexpensive construction and wherein the readily gasifiable components which are gasified incidental to heating of the emulsion are effectively released and the liquid is admitted into the settling chamber in such a manner that it is impossible for any further liquids to gasify incidental to their entering a zone of gradually increasing pressure. If these liquids were such that they would gasify within the settling chamber, they would have vaporized and been released in the zone of lesser pressure at the upper portion of the conductor flumes 9 and 12 and be separated from the liquid for discharge through the pipe 27.

What we claim and desire to secure by Letters Patent is:

1. A vessel of the character described including, top, bottom and side walls, a partition arranged transversely of the vessel and dividing the vessel vertically thereof to provide a settling chamber in said vessel at one side of the partition and an up flume and a heating chamber in said vessel at the other side of the partition, said partition having an intermediate offset portion intermediate the height thereof forming a top for the heating chamber and having the upper end terminating short of the top of the vessel to provide an outlet for the up flume, means for admitting a liquid mixture consisting of gas and two liquid phases into the heating chamber, means connected with the upper portion of the vessel for withdrawing light liquid components of said mixture from the settling chamber at a level to maintain a gas space in the top of the vessel, means connected with the vessel for withdrawing gas from the gas space, means connected with the settling chamber of the vessel for withdrawing heavier liquid components of the mixture below the liquid level maintained in the vessel, a second transverse partition spaced laterally from the portion of the first named portion above the offset portion of the first mentioned partition and cooperating to provide a down flume therebetween for receiving flow from the up flume and having its upper end terminating in the gas space and its lower end spaced above said offset portion and forming an outlet for the liquid into the settling chamber, and means for heating the liquid mixture in the heating chamber.

2. A vessel of the character described including, top, bottom and side walls, a partition arranged transversely of the vessel and dividing the vessel vertically thereof to provide a settling chamber in said vessel at one side of the partition and an up flume and a heating chamber in said vessel at the other side of the partition, said partition having an intermediate offset portion intermediate the height thereof forming a top for the heating chamber and having the upper end terminating short of the top of the vessel to provide an outlet for the up flume, means for admitting a liquid mixture consisting of a gas and two liquid phases into the heating chamber, means connected with the upper portion of the vessel for withdrawing light liquid components of said mixture from the settling chamber at a level to maintain a gas space in the top of the vessel, means connected with the vessel for withdrawing gas from the gas space, means connected with the settling chamber of the vessel for withdrawing heavier liquid components of the mixture below the liquid level maintained in the vessel, a second transverse partition spaced laterally from the portion of the first named portion above the offset portion of the first mentioned partition and cooperating to provide a down flume therebetween for receiving flow from the up flume and having its upper end terminating in the gas space and its lower end spaced above said offset portion and forming an outlet for liquid into the settling chamber, and means for heating the liquid mixture in the heating chamber, said first named partition having a flow opening between the heating chamber and the settling chamber for passing the heavy liquid components from the heating chamber to the heavier liquid component with drawing means.

3. A vessel of the character described including, a top, bottom and a cylindrical side wall, a partition arranged transversely of the vessel and having side edges connected with the cylindrical wall to divide the vessel into a heating chamber in the lower portion of the vessel, an up flume extending from the heating chamber toward the top of the vessel on one side of the partition, and a settling chamber at the other side of the partition, said partition having the upper end terminating short of the top of the vessel to provide an outlet for the up flume, means for admitting a liquid mixture consisting of a gas and two liquid phases into the heating chamber, means connected with the upper portion of the vessel for withdrawing light liquid components of said mixture from the settling chamber at a level to maintain a gas space in the top of the vessel, means connected with the vessel for withdrawing gas from the gas space, means connected with the settling chamber of the vessel for withdrawing heavier liquid components of the mixture at a point below the liquid level maintained in the vessel, a second transverse partition spaced laterally from the upper portion of the first named partition with side edges thereof connected with the side wall in cooperating relation with the first named partition to provide a down flume therebetween to receive flow from the up fnme and having its upper end terminating in the gas space and its lower end spaced above the heating chamber to provide an outlet into the settling chamber, and means in the heating chamber for heating the liquid mixture.

4. A vessel of the character described including, a top, bottom and a cylindrical side wall, a partition arranged transversely of the vessel and having side edges connected with the cylindrical side wall to divide the vessel vertically thereof to provide a settling chamber at one side of the partition and an up flume and a heating chamber at the other, said partition having an intermediate offset portion forming a top of the heating chamber and having the upper end terminating short of the top of the vessel to provide an outlet for the up flume, means for admitting a liquid mixture consisting of a gas and two liquid phases into the heating chamber transversely thereof and parallel with the partition, means connected with the upper portion of the vessel for withdrawing light liquid components of said mixture from the settling chamber at a level to maintain a gas space in the top of the vessel, means connected with the vessel for withdrawing gas from the gas space, means connected with the settling chamber of the vessel for withdrawing heavier liquid components of the mixture below the liquid level maintained in the vessel, a second transverse partition spaced laterally from the portion of the first named portion above the heating chamber to provide a down flume therebetween for receiving flow from the up flume and having its upper end terminating within the gas space and its lower end spaced above said offset portion and forming an outlet into the settling chamber, and means for heating the liquid mixture in the heating chamber.

5. A vessel of the character described including, top, bottom and side walls, a partition arranged transversely within the vessel and dividing the vessel vertically thereof into a settling chamber at one side of the partition and an up flume and a heating chamber at the other, said partition having an intermediate offset portion forming a top of the heating chamber and having the upper end terminating short of the top of the vessel to provide an outlet for the up flume, means for admitting a liquid mixture consisting of a gas and two liquid phases into the heating chamber, a fire box extending transversely through the heating chamber below said offset portion and parallel with the partition whereby the fire box is positioned solely within the heating chamber, means connected with the upper portion of the vessel for withdrawing light liquid components of said mixture from the settling chamber at a level to maintain a gas space in the top of the vessel, means connected with the vessel for withdrawing gas from the gas space, means connected with the settling chamber of the vessel for withdrawing heavier liquid components of the mixture below the liquid level maintained in the vessel, a second transverse partition spaced laterally from the portion of the first named portion above the heating chamber to provide a down flume therebetween for receiving flow from the up flume and having its upper end terminating in the gas space and its lower end spaced above said offset portion and forming an outlet into the settling chamber, and means for heating the liquid mixture in the heating chamber.

ISAAC W. LOVELADY.
VERNE PALMER.